US012392298B2

(12) United States Patent
Chagnot Auclair et al.

(10) Patent No.: US 12,392,298 B2
(45) Date of Patent: Aug. 19, 2025

(54) ENGINE BRAKE METHOD FOR OPERATING A VEHICLE WITH A TURBOCHARGED INTERNAL COMBUSTION ENGINE AND ASSOCIATED VEHICLE

(71) Applicant: VOLVO TRUCK CORPORATION, Gothenburg (SE)

(72) Inventors: Frank Chagnot Auclair, Saint Anne de Gervonde (FR); Herve Queret, Saint-Just Chaleyssin (FR); Laurent Bauvir, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/794,102

(22) Filed: Aug. 5, 2024

(65) Prior Publication Data

US 2025/0052188 A1 Feb. 13, 2025

(30) Foreign Application Priority Data

Aug. 11, 2023 (EP) .................................... 23191108

(51) Int. Cl.

| | |
|---|---|
| ***F02D 13/04*** | (2006.01) |
| ***F02B 37/22*** | (2006.01) |
| ***F02D 9/06*** | (2006.01) |
| ***F02D 41/00*** | (2006.01) |
| ***F02D 41/14*** | (2006.01) |

(52) U.S. Cl.

CPC .............. *F02D 13/04* (2013.01); *F02B 37/22* (2013.01); *F02D 9/06* (2013.01); *F02D 41/0007* (2013.01); *F02D 41/1401* (2013.01)

(58) Field of Classification Search

CPC ......... F02D 13/04; F02D 9/06; F02D 41/0007

See application file for complete search history.

(56) References Cited

U.S. PATENT DOCUMENTS

| | | | | |
|---|---|---|---|---|
| 2002/0174849 | A1 | 11/2002 | Ruggiero et al. | |
| 2009/0211246 | A1 | 8/2009 | McEwan et al. | |
| 2010/0101531 | A1 | 4/2010 | Carlström et al. | |
| 2011/0100324 | A1 | 5/2011 | Xin | |
| 2013/0042609 | A1 * | 2/2013 | Cianflone | F02D 23/00 73/114.77 |
| 2015/0047601 | A1 | 2/2015 | Hellemann | |
| 2015/0144097 | A1 | 5/2015 | Lingens et al. | |
| 2016/0169127 | A1 | 6/2016 | Rammer et al. | |
| 2016/0169128 | A1 | 6/2016 | Rammer et al. | |

OTHER PUBLICATIONS

European Search Report for European Patent Application No. 23191108.2, dated Feb. 1, 2024, 2 pages.

* cited by examiner

*Primary Examiner* — Ngoc T Nguyen
(74) *Attorney, Agent, or Firm* — Sage Patent Group

(57) ABSTRACT

An engine brake method is for operating a vehicle with a turbocharged internal combustion engine. The engine comprises a boost pressure regulation device, which is configured to adjust the boost pressure in the intake manifold, and an exhaust gas restriction device, which is located downstream from a turbine of the turbocharger and which is configured to regulate an air exhaust pressure in an exhaust manifold. The engine brake method includes a dual phase during which, simultaneously, the boost pressure regulation device regulates the air exhaust pressure in the exhaust manifold in closed loop, and the exhaust gas restriction device controls the boost pressure in closed loop.

7 Claims, 7 Drawing Sheets

ENGINE BRAKE METHOD FOR OPERATING A VEHICLE WITH A TURBOCHARGED INTERNAL COMBUSTION ENGINE AND ASSOCIATED VEHICLE

CROSS REFERENCE TO RELATED APPLICATION

This application claims foreign priority to European Application No. 23191108.2 filed on Aug. 11, 2023, the disclosure and content of which is incorporated by reference herein in its entirety.

TECHNICAL FIELD

The disclosure relates generally to engine brake for turbocharged engine vehicles.

BACKGROUND

Engine brake is a critical feature for commercial vehicles as it makes it possible to maintain a constant speed downhill for long periods without using the foundation brakes, which is favorable to both safety and drivability. Engine brake is typically achieved by using both a compression release system, for example a so-called Jacobs bleeder brake, and an exhaust gas restriction device, for example a proportional flap, which is installed after the turbocharger's turbine and which controls a target air pressure in the exhaust manifold. Unfortunately, this control strategy achieves limited results in terms of braking power, since closing the flap also results in decreasing the airflow going through the engine. This has several secondary negative effects, such as overheating nozzle tips of the fuel injectors—by lack of air to cool them down—, increasing oil rejection at the outlet of the turbocharger's compressor—by lack of air pressure in the compressor housing to keep its seal tight—, etc.

Alternative approaches have tried to solve these issues. For example, on engines comprising a turbocharger with moveable elements to adjust an output of the turbocharger—also called VGT—, an alternative to using the exhaust flap is to control the exhaust back-pressure with the VGT instead: this is known as "VGT braking". Increasing the exhaust back-pressure with the VGT also increases the air flow at the same time, which benefits the efficiency of the compression release system. However, since it also results in a reduced difference between intake pressure and exhaust pressure, braking power is actually not much improved with VGT braking. Another drawback of this strategy lies in its slow and sluggish response, up to several seconds, caused by the time it takes to pressurize the whole intake system.

SUMMARY

According to a first aspect of the disclosure, the invention concerns an engine brake method for operating a vehicle with a turbocharged internal combustion engine. The engine comprises:

- several cylinders, which are connected to an intake manifold, collecting fresh air, and to an exhaust manifold, collecting exhaust air from the cylinders,
- a turbocharger; with a compressor driven by a turbine, the compressor being configured to increase a boost pressure of the fresh air in the intake manifold, while the turbine is configured to be driven by the exhaust air flowing from the exhaust manifold;
- a boost pressure regulation device, which is configured to adjust the boost pressure in the intake manifold, and
- an exhaust gas restriction device, which is located downstream from the turbine and which is configured to adjust an exhaust air pressure in the exhaust manifold.

The engine brake method comprises a dual phase during which, simultaneously:

- the boost pressure regulation device regulates the air exhaust pressure in the exhaust manifold in closed loop, in order to regulate the exhaust pressure to a pre-determined first threshold, and
- the exhaust gas restriction device controls the boost pressure in closed loop, in order to regulate the boost pressure to a pre-determined second threshold.

A technical benefit may include increasing both boost pressure and air exhaust pressure, thus resulting in a higher engine brake effect. Simultaneously, the air flow through the cylinders remains at a higher level, contributing to the cooling of the injector tips. Additionally, the pressure differential between boost pressure and air exhaust pressure remains positive, preventing oil leaks through the compressor seal. On steep downhill roads, it is therefore possible to increase the load of the vehicle, and/or to drive the vehicle on steeper roads, while regulating the speed of the vehicle solely based on engine brake, i.e. without using the foundation brake. The overall safety of the vehicle is therefore improved.

Optionally in some examples, including in at least one preferred example, the engine comprises an intake throttle valve, which is arranged between the turbocharger and the intake manifold and which is configured to control the boost pressure, whereas during the dual phase, the intake throttle valve forms the boost pressure regulation device and regulates the air exhaust pressure in the exhaust manifold in closed loop. A technical benefit may include implementing the dual phase by using commonly used equipment.

Optionally in some examples, including in at least one preferred example, the turbocharger is a variable geometry turbocharger, which comprises moveable elements to adjust an output of the turbocharger, whereas during the dual phase, the variable geometry turbocharger forms the boost pressure regulation device and regulates the air exhaust pressure in the exhaust manifold in closed loop. A technical benefit may include implementing the dual phase by using commonly used equipment.

Optionally in some examples, including in at least one preferred example, the engine brake method further comprising an initial phase, prior to the dual phase. The initial phase comprises a first phase, during which the exhaust air pressure is controlled by the restriction device while the turbocharger is in open loop, so as to let exhaust air pressure to increase up to the first threshold, and a second phase, which follows the first phase and during which, once the exhaust air pressure reaches the first threshold, the restriction device is locked in position, while the turbocharger controls the air exhaust pressure in the exhaust manifold in closed loop, so as to let boost pressure increase up to the second threshold. If, during the second phase, the boost-pressure reaches the second threshold before a pre-determined time period, then the initial phase ends and the dual phase starts. A technical benefit may include ensuring a smooth, stable and rapid transition from the motoring mode of the engine to the engine brake mode.

Optionally in some examples, including in at least one preferred example, the engine further comprises bleeder valves, each bleeder valve being associated with a respective cylinder and being configured to, when activated, let compressed air to leak from the cylinders through an opening of the bleeder valve, whereas the engine brake method comprises adjusting an opening of the bleeder valve, in order to maximize a braking effect of the engine during the dual phase. A technical benefit may include improving further the engine brake performance of the vehicle.

Optionally in some examples, including in at least one preferred example, the dual phase is engaged when the engine has a speed, given in revolutions per minute, above a pre-determined third threshold. A technical benefit may include ensuring a higher engine brake effect compared to prior art methods.

According to a second aspect of the disclosure, the invention concerns a vehicle, comprising a turbocharged internal combustion engine. The vehicle is configured to implement the engine brake method according to any one of preceding claims. The engine comprises:

- several cylinders, which are connected to an intake manifold, which is configured to collect fresh air, and to an exhaust manifold, which is configured to collect exhaust air from the cylinders,
- a turbocharger; with a compressor driven by a turbine, the compressor being configured to increase a boost pressure in the intake manifold, while the turbine is configured to be driven by the exhaust air flowing from the exhaust manifold;
- a boost pressure regulation device, which is configured to adjust the boost pressure in the intake manifold, and
- an exhaust gas restriction device, which is located downstream from the turbine and which is configured to increase an exhaust air pressure in the exhaust manifold.

The second aspect of the disclosure may seek to provide a vehicle, for example a truck, with an improved engine brake capacity. A technical benefit may include allowing a higher load on downhill roads and/or allowing speed regulation on steeper downhill roads.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

The detailed description set forth below provides information and examples of the disclosed technology with sufficient detail to enable those skilled in the art to practice the disclosure.

Embodiments of the present disclosure are directed to solving the problems mentioned above, by providing an engine brake method achieving a high braking power output while keeping operating parameters-such as injector cooling-within their specified ranges. In particular aspects of the disclosure relates to an engine brake method for operating a vehicle with a turbocharged internal combustion engine and to a vehicle configured to implement such an engine brake method. The disclosure can be applied to heavy-duty vehicles, such as trucks, buses, and construction equipment, among other vehicle types. Although the disclosure may be described with respect to a particular vehicle, the disclosure is not restricted to any particular vehicle.

Figure 1:
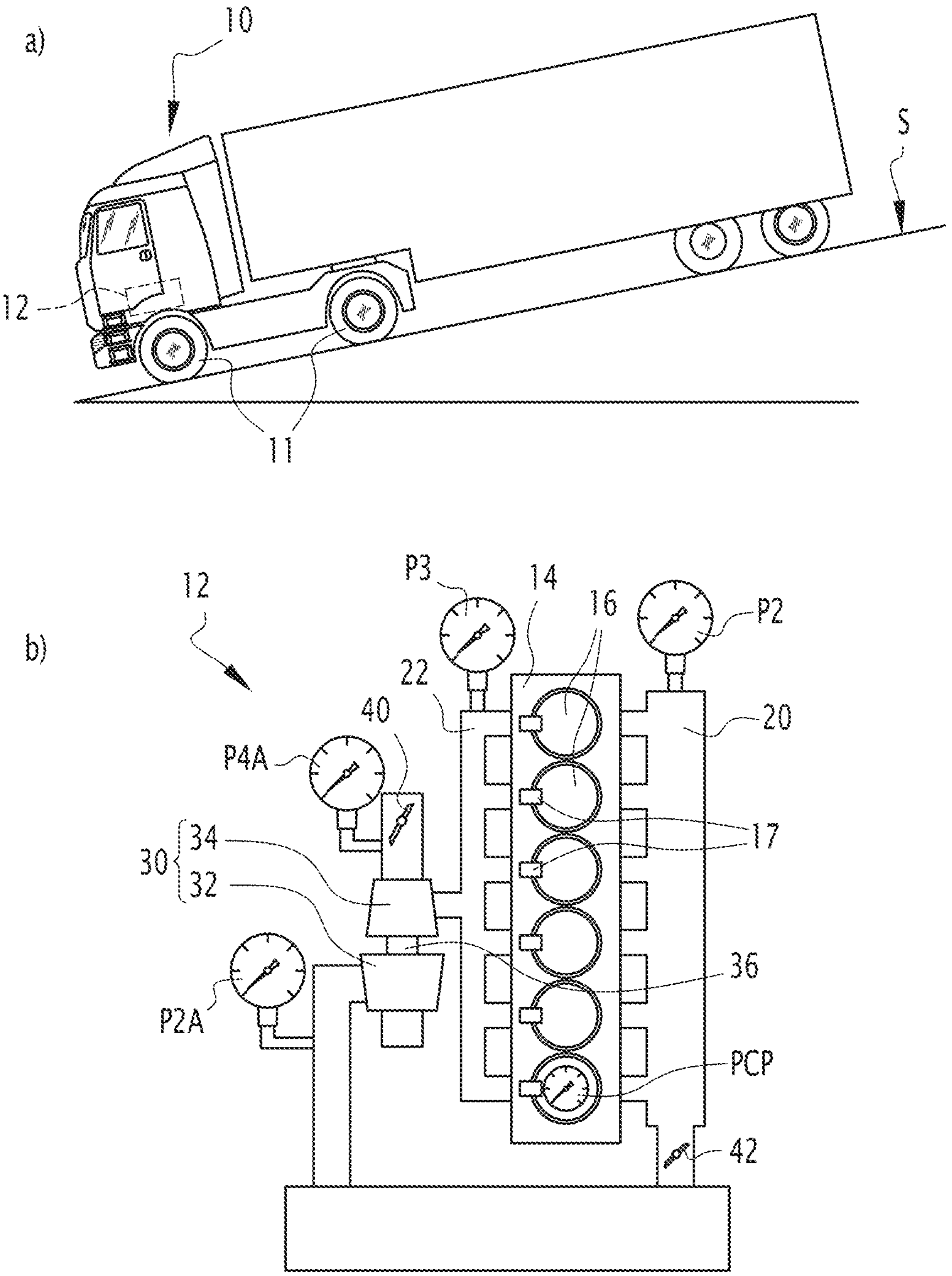
FIG. 1 represents, on two inserts a) and b); an exemplary vehicle according to the invention and an engine of this vehicle.
Figure 2:
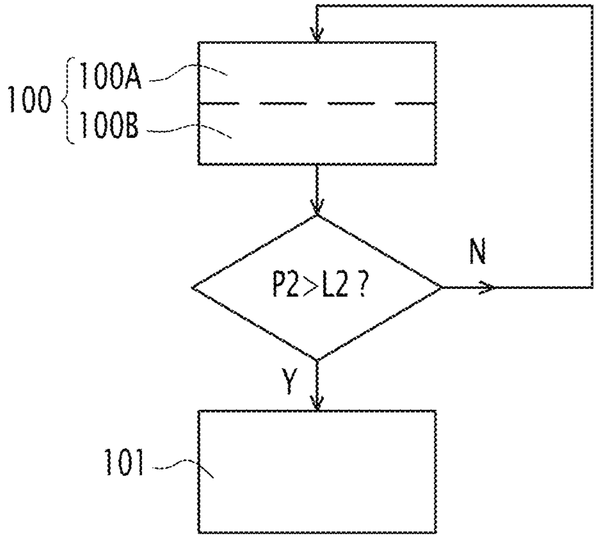
FIG. 2 is an exemplary synoptic diagram representing an engine brake method implemented with the vehicle of FIG. 1.

A vehicle 10 is represented on FIG. 1*a*). The vehicle 10 is a road vehicle, in particular a truck, which comprises wheels 11. The vehicle 10 comprises an engine 12, which is schematically shown on FIG. 1*b*). The engine 12 is an internal combustion engine, which is configured to use fuel in order to drive the wheels 11 in rotation, in order to move the vehicle 10. When the engine 12 uses fuel to rotate the wheel 10, the engine 12 is in a motoring mode. On the contrary, when the engine 12 is used to waste energy, the engine 12 is in an "engine brake" mode, that is to say the engine 12 applies a braking torque to the wheels 11. On FIG. 1, the vehicle 10 is represented on a downhill slope S, where the vehicle 10 tends to naturally accelerate because of gravity. The engine 12 is used in the engine brake mode in order to regulate a speed of the vehicle 10.

The engine 12 comprises a main block 14 with several cylinders 16. In the illustrated example, the engine 12 is a four-stroke engine with six cylinders 16. For each cylinder 16, the four strokes include, successively, an intake stroke, a compression stroke, an expansion stroke, and an exhaust stroke.

When the engine 12 is running, during the intake stroke or each cylinder 16, fresh air flowing through an intake manifold 20 is admitted into each cylinder 16, through at least one intake valve. The at least one intake valve is not represented. During the exhaust stroke, air contained in the cylinder 16 is evacuated through at least one exhaust valve and collected in an exhaust manifold 22. The at least one exhaust valve is not represented. In other words, the cylinders 16 are connected to the intake manifold 20, which collects fresh air, and to the exhaust manifold 22, which collects exhaust air from the cylinders 16. When the engine 12 is in the motoring mode, fuel is injected in the cylinders and the air+fuel mix is ignited during the compression and expansion strokes. During the following exhaust stroke, the air evacuated from the cylinders 16 is hot and contains various substances and residues resulting from fuel combustion. Air containing these combustion residues is also called exhaust gas.

When the engine 12 is in the engine brake mode, no fuel is injected into the cylinders 16 and no combustion occurs. The air evacuated from the cylinders 16 during the exhaust stroke is mostly fresh air that has been admitted during the intake stroke, then compressed and expanded inside the cylinders 16 during the compression and expansion strokes.

Air flowing from the cylinders 16 into the exhaust manifold 22 is also called "exhaust air". Fresh air flowing from the intake manifold 20 into the cylinders 16 is also called "charge air". The intake manifold 20 is located upstream from the cylinders 16 relative to the normal flow of air in the engine 12, while the exhaust manifold 22 is located downstream from the cylinders 16 relative to the normal flow of air in the engine 12. In the following description, the notions of "upstream" and "downstream" are considered relatively to the flow of air during normal use of the engine 12.

"Normal use" means that the engine 12 is either in the motoring mode, or in the engine brake mode.

The engine 12 also comprises a turbocharger 30. The turbocharger 30 comprises a compressor 32 and a turbine 34, the compressor 32 being linked to the turbine 34 by an axle 36. The turbine 34 is configured to be driven in rotation by the exhaust air flowing from the exhaust manifold 22, while the compressor 32 is configured to increase a pressure of the charge air flowing in the intake manifold 20 then into the cylinders 16.

When the engine 12 is in the engine brake mode, during the compression/expansion strokes in each cylinder 16, air pressure reaches a peak, called "peak cylinder pressure" PCP. In the schematic example of FIG. 1*b*), one of the cylinder 16 comprises a first pressure sensor, here represented figuratively by a manometer, the first pressure sensor being configured to measure air pressure within the cylinder 16. In particular, the first pressure sensor, also referenced PCP, is configured to measure the peak cylinder pressure. Of course, in reality there is no manometer inside any one of the cylinders 16.

A second pressure sensor P2, represented figuratively by a manometer, is arranged on the intake manifold 20, the second pressure sensor P2 being configured to measure a boost pressure, that is to say an air pressure inside the intake manifold 20. By extension, boost pressure is also referenced P2. A third pressure sensor P3, represented figuratively by a manometer, is arranged on the exhaust manifold 22, the third pressure sensor P3 being configured to measure an exhaust pressure, that is to say an air pressure inside the exhaust manifold 22. By extension, exhaust pressure is also referenced P3.

The engine also comprises an exhaust gas restriction device 40, which is located downstream from the turbine 34 and which is configured to regulate the exhaust pressure P3 in the exhaust manifold 22. In the illustrated example, the exhaust gas restriction device 40 is a flap, also called "exhaust flap". The shape and type of the exhaust gas restriction device 40 are not limitative.

The engine 10 also comprises a fourth pressure sensor P4A, represented figuratively by a manometer, which is arranged downstream from the turbine 34 and which is configured to measure a turbine outlet pressure, that is to say a pressure of exhaust air at an outlet of the turbine 34, between the turbine 34 and the exhaust gas restriction device 40. By extension, the turbine outlet pressure is also referenced P4A.

The engine 10 also comprises a boost pressure regulation device 42, which is configured to adjust the boost pressure P2 in the intake manifold 20. In the illustrated example, the boost pressure regulation device 42 is an intake throttle valve, which is represented by a flap and which is arranged between the turbocharger 30 and the intake manifold 20, and which is configured to control the boost pressure P2. The shape and type of the boost pressure regulation device 42 are not limitative.

Schematically, braking torque from the engine 12 comes mainly from the combination of two phenomena. A first phenomenon is called pumping torque, which is caused by the exhaust pressure P3 being higher than the boost pressure P2. The higher the difference between P3 and P2, the higher the braking torque. A second phenomenon is called compression release torque, or compression brake. Each cylinder 16 is advantageously equipped with a bleeder valve 17, which is configured to let the air compressed inside the cylinder 16 to leak from the cylinder 16 through an opening of the bleeder valve 17 when the engine 12 is in the engine brake mode, while each bleeder valve 17 remains closed when the engine 12 is in the motoring mode.

Without a bleeder valve, when air is compressed in the cylinders 16 during the compression stroke, the mechanical energy invested in compressing air is almost entirely recovered by the expansion within the cylinder 16 during the expansion stroke. Thanks to the bleeder valve 17, the compressed air is released outside the cylinder 16 through the opening of the bleeder valve 17, and the energy that went into making the compression is wasted by releasing the compressed air instead of letting it expand inside the cylinder 16. The higher the peak cylinder pressure PCP, prior to releasing this compressed air, the higher the wasted energy, and the higher the braking torque generated by compression brake.

According to some examples, the bleeder valve 17 is a specific device, different from the intake and exhaust valves. Alternatively, the bleeder valve 17 comprises an actuator that is configured to slightly open one or more existing exhaust valve(s) when the engine 12 is in the engine brake mode. Such type of bleeder valve is also known as "Jacobs valve", and compression brake using such a Jacobs valve is also called "Jacobs brake".

In short, when the engine 12 is in the engine brake mode, maximizing braking torque involves maximizing both the peak cylinder pressure PCP and the pressure difference between exhaust pressure and intake pressure, P3-P2. To achieve this, the engine 12 is configured to implement an engine brake method, the engine brake method comprising a phase, called "dual phase" 101, during which, simultaneously:

- the boost pressure regulation device 42 regulates the air exhaust pressure P3 in the exhaust manifold 22 in closed loop, in order to regulate the exhaust pressure to a pre-determined first threshold, and
- the exhaust gas restriction device 40 controls the boost pressure P2 in closed loop, in order to regulate the boost pressure P2 to a pre-determined second threshold.

Advantageously, the engine brake method comprises adjusting the opening of the bleeder valve 17 to a specific predetermined target value, in order to maximize a braking torque of the engine 12 during the dual phase. The target value of the opening of the bleeder valve depends on the type, size, power, etc., of the engine 12.

Using the boost pressure regulation device 42 to control the exhaust pressure P3 in closed loop makes the turbocharger 30 draw a lot of fresh air into the engine 12, which increases peak cylinder pressure PCP and cools down the injector tips. Using the exhaust gas restriction device 40 to control P2 in closed loop decreases an expansion ratio of the turbine 34, thus limiting boost pressure P2 to values significantly lower than P3 and contributing to a higher pumping torque. The pressure differential P3-P2 remains positive, which keeps the compressor 32's seal tight.

Results and benefits of the dual phase are illustrated on FIGS. 3 to 6.

Figure 3:
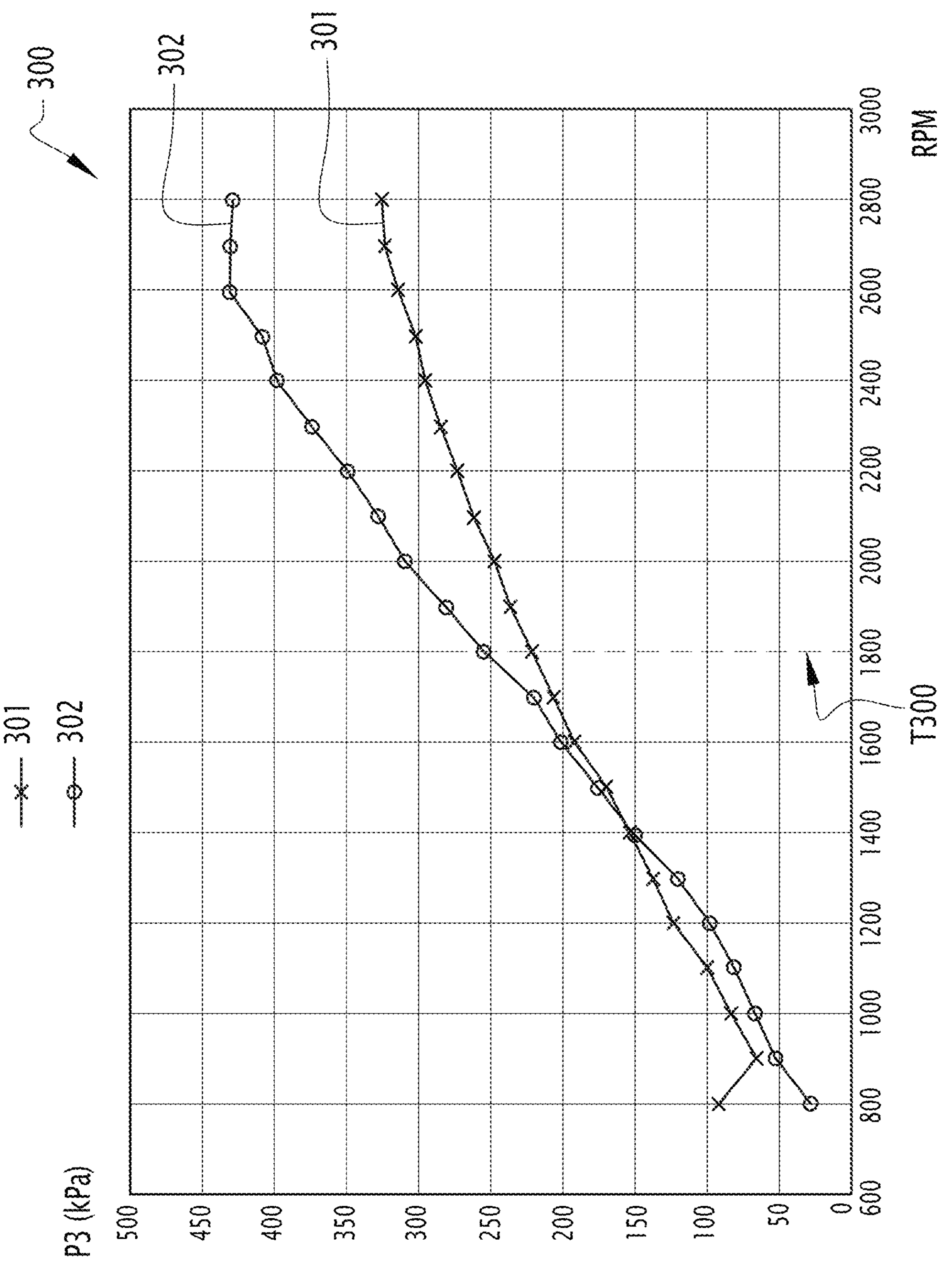
FIGS. 3 to 6 are exemplary graphs comparing results obtained with the engine brake method according to the invention and according to prior art methods.

A graph 300 is shown on FIG. 3. The graph 300 shows the evolution, for an exemplary vehicle 10, of the exhaust pressure P3—expressed in kilo Pascal, or kPa—vs. a speed of the engine 12—expressed in revolutions per minute, or RPM—.

The graph 300 comprises a first curve 301, which illustrates the exhaust pressure P3 when the engine 12 is controlled according to a prior art method. Within the scope of the present description, engine brake according to the prior art method means that the exhaust air pressure P3 is controlled by the restriction device 40 while the turbocharger 30 is in open loop. The graph 300 comprises a second curve 302, which illustrated the exhaust pressure P3 when the engine 12 is controlled with the dual phase 101 method according to the invention.

As seen on the graph 300, the second curve 302 is significantly above the first curve 301 when the engine speed is higher than a pre-determined threshold T300, which is equal to 1800 RPM in the illustrated example. In other words, thanks to the invention, the exhaust pressure P3 is higher when the engine speed is above the threshold T300.

Figure 4:
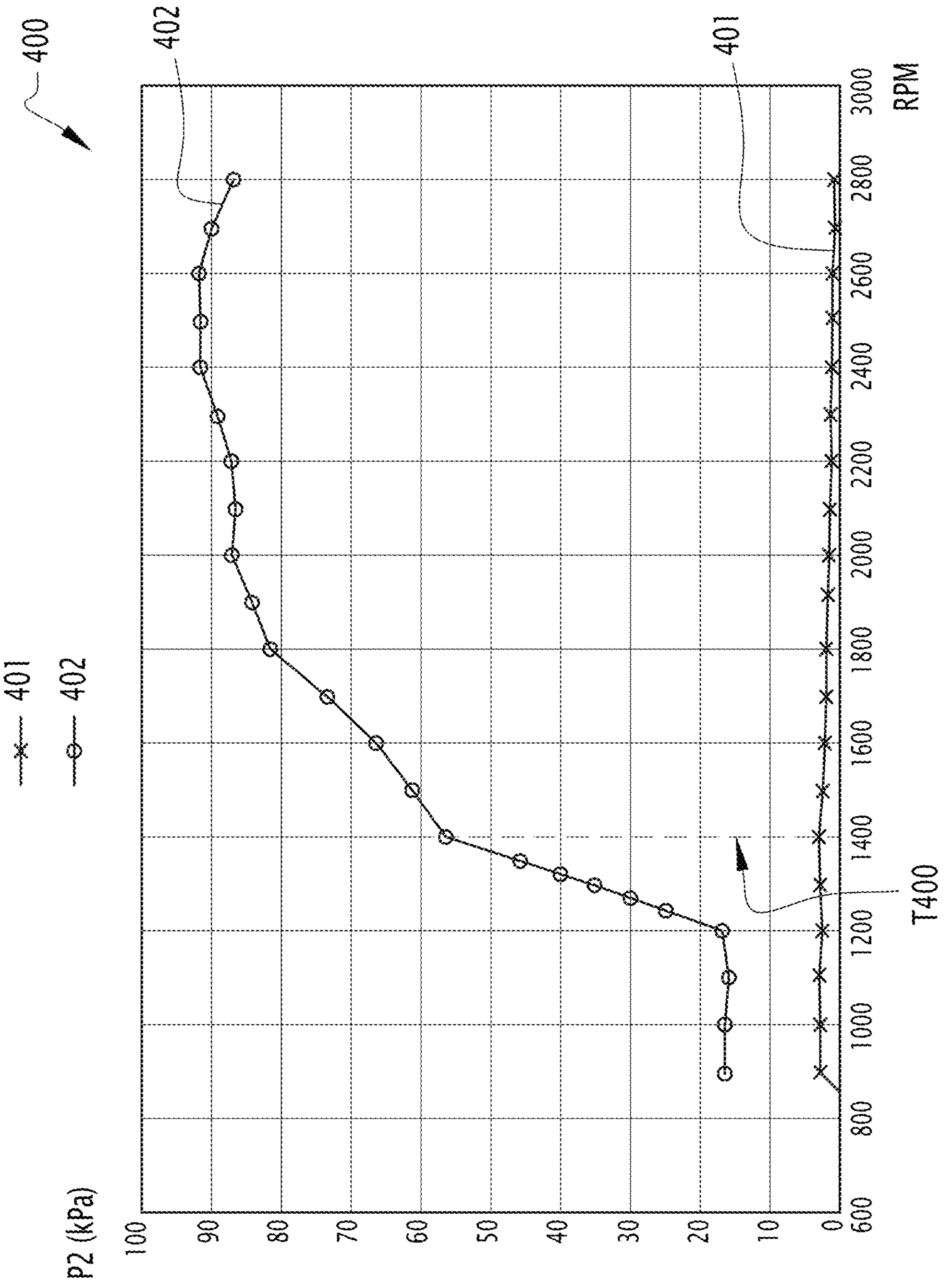

A graph 400 is shown on FIG. 4. The graph 400 shows the evolution, for an exemplary vehicle 10, of the boost pressure P2—expressed in kPa—vs. the speed of the engine 12—expressed in RPM—.

The graph 400 comprises a first curve 401, which illustrates the boost pressure P2 when the engine 12 is controlled according to the prior art method. The graph 400 comprises a second curve 402, which illustrated the boost pressure P2 when the engine 12 is controlled with the dual phase 101 method according to the invention.

As seen on the graph 400, for all illustrated engine speed, the second curve 402 is significantly above the first curve 401. In other words, thanks to the invention, the boost pressure P2 is higher when the engine 12 is controlled with the method according to the invention compared to when the engine 12 is controlled with the prior art method. In particular, in the illustrated example, when the engine speed is above a threshold T400, which is here equal to 1400 RPM, the boost pressure P2 when the engine 12 is controlled with the method according to the invention is at least ten times higher than the boost pressure P2 when the engine 12 is controlled with the prior art method.

Figure 5:
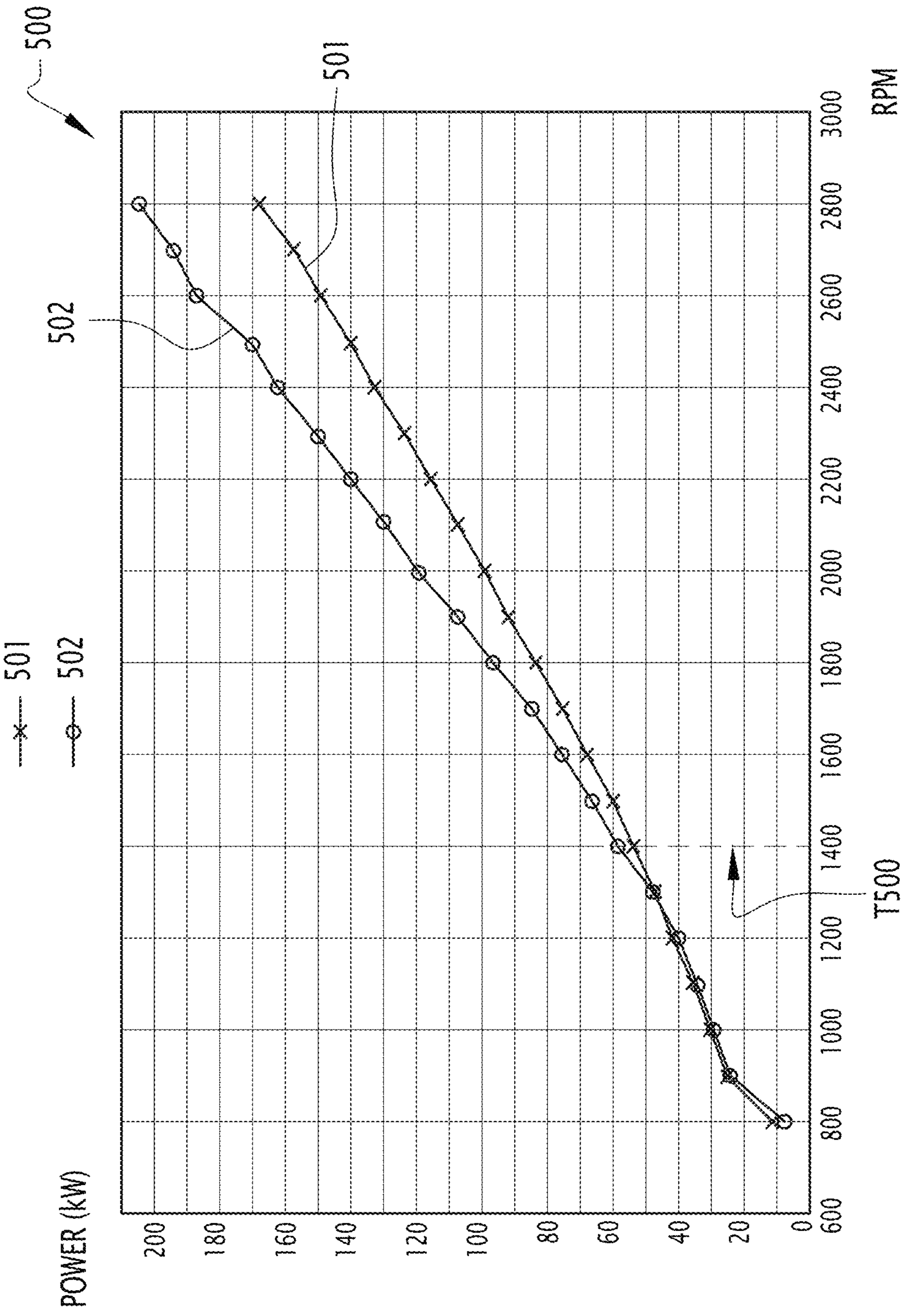

A graph 500 is shown on FIG. 5. The graph 500 shows the evolution, for an exemplary vehicle 10, of the engine brake power-expressed in kilo Watt, or kW-vs. the speed of the engine 12—expressed in RPM—.

The graph 500 comprises a first curve 501, which illustrates the engine brake power when the engine 12 is controlled according to the prior art method. The graph 500 comprises a second curve 502, which illustrated the engine brake power when the engine 12 is controlled with the dual phase 101 method according to the invention.

As seen on the graph 500, the second curve 502 is significantly above the first curve 501 when the engine speed is higher than a pre-determined threshold T500, which is equal to 1400 RPM in the illustrated example. In other words, thanks to the invention, the boost pressure P2 is higher when the engine 12 is controlled with the method according to the invention compared to when the engine 12 is controlled with the prior art method.

In other words, in order to benefit from a higher braking power, the dual phase 101 is engaged when the engine speed is above a pre-determined threshold. In the illustrated example, this threshold is equal to 1400 RPM.

Thanks to control method according to the invention, it is possible to control simultaneously both boost pressure P2 and exhaust pressure P3, which results in an engine brake power significantly higher than what was achievable with the prior art method.

Figure 6:
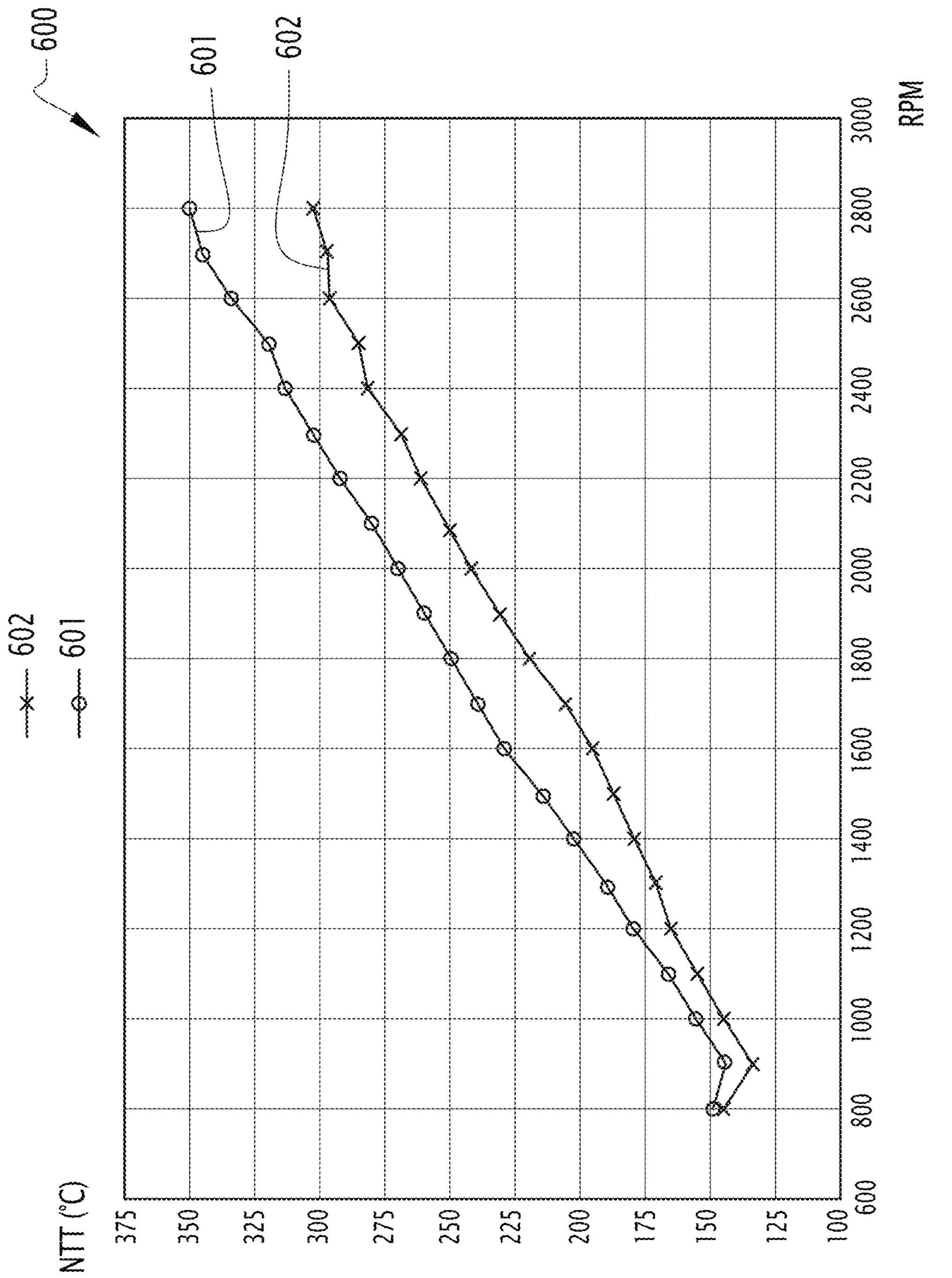

A graph 600 is shown on FIG. 6. The graph 600 shows the evolution, for an exemplary vehicle 10, of a temperature of the tip of an injector's nozzle—nozzle tip temperature, or NTT, expressed in degrees Celsius, or ° C.—vs. the speed of the engine 12—expressed in RPM—.

The graph 600 comprises a first curve 601, which illustrates the nozzle tip temperature NTT when the engine 12 is controlled with the prior art method. The graph 600 comprises a second curve 602, which illustrated the nozzle tip temperature NTT when the engine 12 is controlled with the dual phase 101 method according to the invention.

As seen on the graph 600, for all illustrated engine speed, the second curve 602 is below the first curve 601. In other words, thanks to the invention, the nozzle tip temperature NTT is lower when the engine 12 is controlled with the method according to the invention compared to when the engine 12 is controlled with prior art methods. This is caused by the higher air flow flowing through the cylinders 16, since—among others—the boost pressure P2 is higher in the dual mode compared to prior art methods, as illustrated on graph 400.

When the vehicle 10 is running, moving between flat or uphill roads to downhill roads, the engine 12 may transition between motoring mode and engine brake mode. The dual phase 101 method correspond to an established state of the engine 12 in the engine brake method. Prior to the dual phase 101, the engine brake method according to the invention also comprises an initial phase 100, which is implemented to ensure the transition between the motoring mode and the dual phase 101 of the engine brake mode.

The initial phase 100 is divided in two sub-phase, which include and first phase 100A and a second phase 100B, which follows the first phase 100A.

As the engine 12 is initially in the motoring mode, and the engine 12 is controlled to switch to the engine brake mode. The engine speed, which is linked to the rotation speed of the wheels 11, is supposed to remain sensibly constant during the initial phase. During the first phase 100A, the exhaust air pressure P3 is controlled by the restriction device 40 while the turbocharger 30 is in open loop, so as to let exhaust air pressure P3 to increase up to a pre-determined first threshold L1.

Once the exhaust air pressure P3 reaches the first threshold L1, the second phase 100B starts. During the second phase 100B, the restriction device 40 is locked in position—in other words the restriction device 40 does not regulate exhaust air pressure P3—, while the turbocharger 30 controls the air exhaust pressure P3 in the exhaust manifold 22 in closed loop, so as to let boost pressure P2 increase up to a pre-determined second threshold L2.

During the second phase 100B, if the boost-pressure P2 reaches the second threshold before a pre-determined time period, then the initial phase ends and the dual phase 101 starts. If the boost-pressure P2 does not reach the second threshold, then the dual phase 101 does not start, and the engine reverts to the first phase 100A.

Figure 7:
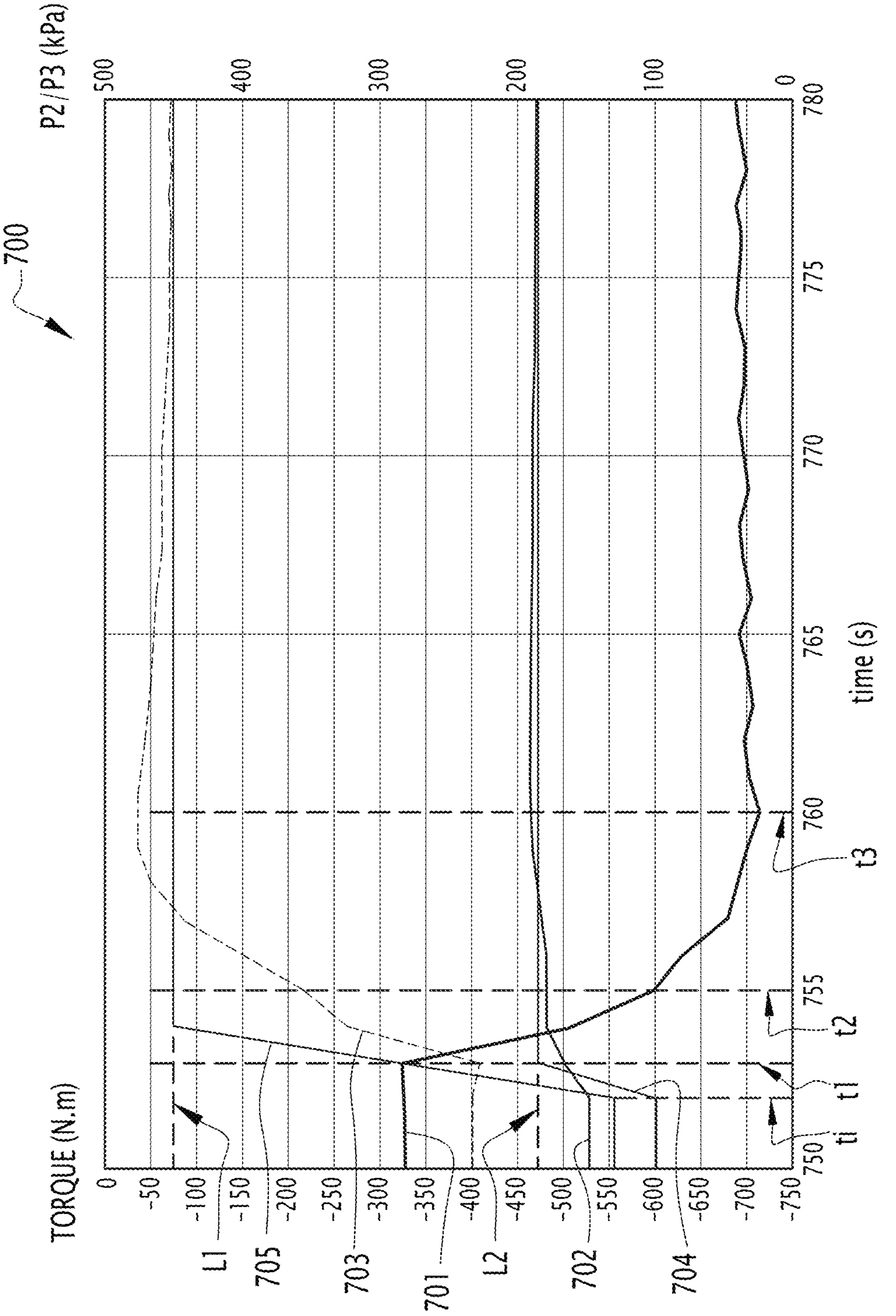
FIG. 7 is an exemplary graph illustrating an initial phase of the engine brake method according to the invention.

A graph 700 is shown on FIG. 7. The graph 700 shows the evolution of several parameters of the engine 12 during the initial phase 100 and dual phase 101. The horizontal axis is a time axis—expressed in seconds—. In the example of FIG. 7, engine speed is considered constant.

The graph 700 comprises a first curve 701, which shows the evolution of a torque—expressed in Newton×meter, or N·m—of the engine 12. On the left hand side vertical axis, the torque is negative, since the engine 12 is in the engine brake mode.

The graph 700 comprises a second curve 702, which shows the evolution of the exhaust pressure P3, expressed in kPa relative to the right hand side vertical axis. The graph 700 comprises a second curve 702, which shows the evolution of the boost pressure P2, expressed in kPa relative to the right hand side vertical axis. The graph 700 comprises a third curve 703, which shows the evolution of the exhaust pressure P3, expressed in kPa relative to the right hand side vertical axis. The graph 700 comprises a fourth curve 704, which shows the evolution of a set-point of the boost pressure P2, expressed in kPa relative to the right hand side vertical axis. The graph 700 comprises a fifth curve 705, which shows the evolution of a set-point of the exhaust pressure P3, expressed in kPa relative to the right hand side vertical axis.

In the illustrated example, at an initial instant ti, the set-point of the exhaust pressure P3 is gradually set to the first threshold L1. The initial instant ti marks the beginning of the first phase 100A. In the illustrated example, starting at the initial instant ti, the set-point of the boost pressure P2 is also gradually set to the second threshold L2. The torque 701 shows an initial plateau, around −330 N·m, prior to the initial instant $t_i$. The exhaust pressure P3 is controlled by the restriction device 40.

At a first instant $t_1$, which is posterior to the initial instant $t_i$, the exhaust pressure P3 starts to rise, in order to narrow the gap with the first threshold L1. Consequently, the torque 701 sharply decreases. In other words, the effect of the engine brake increase. In the illustrated example, the difference between the first instant $t_1$ and initial instant ti is about 0.1 s.

From the first instant $t_1$, the boost pressure P2 also starts to rise, narrowing the gap with the second threshold L2. At a second instant $t_2$, which is posterior to the first instant $t_1$, the boost pressure P2 is sensibly equal to the second threshold L2, while the exhaust pressure P3 continues to rise, and the torque 701 continues to decrease.

At a third instant $t_3$, which is posterior to the second instant $t_2$, the exhaust pressure P3 reaches a maximal value, which is sensibly equal to the first threshold L1. Between the second instant $t_2$ and third instant $t_3$, the torque 701 continues to decrease.

The third instant $t_3$ marks the end of the first phase 100A and the beginning of the second phase 100B. In the illustrated example, the boost pressure P2 is already sensibly equal to the second threshold L2, so the second phase 100B ends immediately and the dual phase 101 starts from the third instant $t_3$ on. In the illustrated example, a duration of the initial phase 100 is sensibly equal to the difference between the third instant $t_3$ and the first instant $t_1$, which is here around 0.7 s.

More generally, if, during the second phase 100B, the boost-pressure P2 does not reach the second threshold L2 before a pre-determined time period, then the initial phase restarts, back to the first phase 100A. This situation might appear in abnormal situation, for example if one of the components of the engine 12 is dysfunctioning. In a normal situation, if during the second phase 100B, the boost-pressure P2 reaches the second threshold L2 before the pre-determined time period, then the initial phase 100 ends and the dual phase 101 starts.

During the dual phase 101, the boost pressure regulation device 42 regulates the air exhaust pressure P3 in the exhaust manifold 22 in closed loop, in order to regulate the exhaust pressure P3 to the pre-determined first threshold L1, while the exhaust gas restriction device 40 controls the boost pressure P2 in closed loop, in order to regulate the boost pressure P2 to the pre-determined second threshold L2. As shown on FIG. 7, during the dual phase 101, the exhaust pressure P3, the boost pressure P2 and the torque 701 are relatively stable.

In the illustrated example, the boost pressure regulation device 42 is the intake throttle valve. During the dual phase 101, the intake throttle valve forms the boost pressure regulation device 42 and regulates the air exhaust pressure in the exhaust manifold 22 in closed loop.

In a non-illustrated alternative embodiment, the turbocharger 30 is a variable geometry turbocharger VGT, which comprises moveable elements to adjust an output of the turbocharger 30, thus forming the boost pressure regulation device 42 when the engine 12 is in the motoring mode. During the dual phase 101 of the engine brake method, the variable geometry turbocharger VGT forms the boost pressure regulation device 42 and regulates the air exhaust pressure P3 in the exhaust manifold 22 in closed loop.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An engine brake method for operating a vehicle with a turbocharged internal combustion engine, wherein:

the engine comprises:

several cylinders, which are connected to an intake manifold, collecting fresh air, and to an exhaust manifold, collecting exhaust air from the cylinders;

a turbocharger, with a compressor driven by a turbine, the compressor being configured to increase a boost pressure of the fresh air in the intake manifold, while the turbine is configured to be driven by the exhaust air flowing from the exhaust manifold;

a boost pressure regulation device, which is configured to adjust the boost pressure in the intake manifold; and an exhaust gas restriction device, which is located downstream from the turbine and which is configured to regulate an air exhaust pressure in the exhaust manifold, the engine brake method comprises a dual phase during which, simultaneously:

the boost pressure regulation device regulates the air exhaust pressure in the exhaust manifold in closed loop, in order to regulate the exhaust pressure to a pre-determined first threshold, and the exhaust gas restriction device controls the boost pressure in closed loop, in order to regulate the boost pressure to a pre-determined second threshold.

2. The engine brake method according to claim 1, wherein:

the engine comprises an intake throttle valve, which is arranged between the turbocharger and the intake manifold and which is configured to control the boost pressure, and during the dual phase, the intake throttle valve forms the boost pressure regulation device and regulates the air exhaust pressure in the exhaust manifold in closed loop.

3. The engine brake method according to claim 1, wherein:

the turbocharger is a variable geometry turbocharger, which comprises moveable elements to adjust an output of the turbocharger, and during the dual phase, the variable geometry turbocharger forms the boost pressure regulation device and regulates the air exhaust pressure in the exhaust manifold in closed loop.

4. The engine brake method according to claim 1, further comprising an initial phase, prior to the dual phase, wherein:

the initial phase comprises:

a first phase, during which the air exhaust pressure is controlled by the restriction device while the turbocharger is in open loop, so as to let exhaust air pressure to increase up to the first threshold, and a second phase, which follows the first phase and during which, once the exhaust air pressure reaches the first threshold, the restriction device is locked in position, while the turbocharger controls the air exhaust pressure in the exhaust manifold in closed loop, so as to let boost pressure increase up to the second threshold, and if, during the second phase, the boost-pressure reaches the second threshold before a pre-determined time period, then the initial phase ends and the dual phase starts.

5. The engine brake method according to claim 1, wherein:

the engine further comprises bleeder valves, each bleeder valve being associated with a respective cylinder and being configured to, when activated, let compressed air to leak from the cylinders through an opening of the bleeder valve, and the engine brake method comprises adjusting an opening of the bleeder valve, in order to maximize a braking effect of the engine during the dual phase.

6. The engine brake method according to claim 1, wherein:

the dual phase is engaged when the engine has a speed, given in revolutions per minute, above a pre-determined third threshold.

7. A vehicle, comprising a turbocharged internal combustion engine, wherein:

the vehicle is configured to implement the engine brake method according to claim 1, the engine comprises:

several cylinders, which are connected to an intake manifold, which is configured to collect fresh air, and to an exhaust manifold, which is configured to collect exhaust air from the cylinders, a turbocharger, with a compressor driven by a turbine, the compressor being configured to increase a boost pressure in the intake manifold, while the turbine is configured to be driven by the exhaust air flowing from the exhaust manifold;

a boost pressure regulation device, which is configured to adjust the boost pressure in the intake manifold, an exhaust gas restriction device, which is located downstream from the turbine and which is configured to adjust an exhaust air pressure in the exhaust manifold.

* * * * *